United States Patent
Xu et al.

(10) Patent No.: US 11,680,857 B2
(45) Date of Patent: Jun. 20, 2023

(54) ULTRASONIC TEST DEVICE AND TEST METHOD FOR SERVICE STRESS OF A MOVING MECHANICAL COMPONENT

(71) Applicant: BEIJING INSTITUTE OF TECHNOLOGY, Beijing (CN)

(72) Inventors: Chunguang Xu, Beijing (CN); Shuangyi Li, Beijing (CN); Yuren Lu, Beijing (CN); Peng Yin, Beijing (CN); Dezhi Li, Beijing (CN); Wenyuan Song, Beijing (CN)

(73) Assignee: BEIJING INSTITUTE OF TECHNOLOGY, Beijing (CN)

( * ) Notice: Subject to any disclaimer, the term of this patent is extended or adjusted under 35 U.S.C. 154(b) by 66 days.

(21) Appl. No.: 17/331,045

(22) Filed: May 26, 2021

(65) Prior Publication Data

US 2021/0389195 A1 Dec. 16, 2021

(30) Foreign Application Priority Data

Jun. 12, 2020 (CN) .......................... 202010536050.7

(51) Int. Cl.
   *G01L 1/25* (2006.01)
   *G01L 5/00* (2006.01)
   (Continued)

(52) U.S. Cl.
   CPC ............ *G01L 1/255* (2013.01); *G01L 5/0047* (2013.01); *G01L 5/0066* (2013.01);
   (Continued)

(58) Field of Classification Search
   CPC ....... G01L 1/255; G01L 25/00; G01L 5/0047; G01L 5/0066; G01M 13/00; G01M 5/005;
   (Continued)

(56) References Cited

U.S. PATENT DOCUMENTS 4,033,178 A * 7/1977 Holt ...................... G01N 29/28
 73/644
4,080,836 A * 3/1978 Thompson ......... G01N 29/2412
 73/597

(Continued)

FOREIGN PATENT DOCUMENTS

CN 103018326 A 4/2013
CN 105158342 A 12/2015
(Continued)

*Primary Examiner* — David L Singer
(74) *Attorney, Agent, or Firm* — Shumaker, Loop & Kendrick, LLP; John A. Miller

(57) ABSTRACT

An ultrasonic test device and test method for service stress of a moving mechanical component, where the device comprises an ultrasonic probe, a coupling fluid, a pressure-maintaining cover and universal wheels. The cover is vertically arranged above an inspected position of an inspected component, an interior of the pressure-maintaining cover is filled with coupling fluid, a bottom of the cover is provided with a structure permeable to the coupling fluid to form a coupling fluid film between the inspected position and the bottom of the cover, and a top of the cover is equipped with the ultrasonic probe. A detection part at a lower part of the ultrasonic probe extends into the coupling fluid of the cover and is vertical to the bottom of the cover without contact. The distance between the ultrasonic probe and the inspected component is kept unchanged through the universal wheels.

7 Claims, 3 Drawing Sheets

(51) Int. Cl.
*G01N 29/275* (2006.01)
*G01N 29/28* (2006.01)
*G01N 29/30* (2006.01)
*G01N 29/22* (2006.01)
*G01N 29/07* (2006.01)

(52) U.S. Cl.
CPC ........... *G01N 29/275* (2013.01); *G01N 29/28* (2013.01); *G01N 29/30* (2013.01); *G01N 29/07* (2013.01); *G01N 29/225* (2013.01); *G01N 2291/101* (2013.01); *G01N 2291/2623* (2013.01); *G01N 2291/2626* (2013.01); *G01N 2291/2634* (2013.01)

(58) Field of Classification Search
CPC ..... G01N 2291/101; G01N 2291/2623; G01N 2291/2626; G01N 2291/2634; G01N 29/07; G01N 29/225; G01N 29/227–228; G01N 29/275; G01N 29/28; G01N 29/30
See application file for complete search history.

(56) References Cited

U.S. PATENT DOCUMENTS

| | | | | |
|---|---|---|---|---|
| 6,748,808 | B2* | 6/2004 | Lam | G01N 29/4445 73/622 |
| 8,087,298 | B1* | 1/2012 | DiMambro | G01N 29/262 73/644 |
| 9,121,817 | B1* | 9/2015 | Roach | G01N 29/28 |
| 2001/0049587 | A1 | 12/2001 | Bray | |
| 2009/0301203 | A1* | 12/2009 | Brussieux | G01N 29/225 901/1 |
| 2015/0300897 | A1* | 10/2015 | Xu | G01N 29/265 73/597 |
| 2020/0262261 | A1* | 8/2020 | Loosararian | B25J 9/1617 |

FOREIGN PATENT DOCUMENTS

| | | | | |
|---|---|---|---|---|
| CN | 105738028 | A | | 7/2016 |
| CN | 105992900 | A * | 10/2016 | ............. G01B 21/22 |
| CN | 106170371 | A * | 11/2016 | ............. B25J 5/007 |
| CN | 106813819 | A * | 6/2017 | ........... G01N 29/043 |
| CN | 107328860 | A * | 11/2017 | |
| CN | 107328860 | A | | 11/2017 |
| CN | 108168746 | A * | 6/2018 | |
| CN | 108572040 | A | | 9/2018 |
| CN | 109883592 | A | | 6/2019 |
| CN | 210077864 | U | | 2/2020 |
| KR | 20110033609 | A * | 3/2011 | |

\* cited by examiner

ULTRASONIC TEST DEVICE AND TEST METHOD FOR SERVICE STRESS OF A MOVING MECHANICAL COMPONENT

CROSS-REFERENCE TO RELATED APPLICATIONS

This application claims priority to China Patent Application Serial No. 202010536050.7 filed Jun. 12, 2020, the entire disclosure of which is herein incorporated by reference.

BACKGROUND

Field

The present disclosure relates to the technical field of testing of service stress of a mechanical component, in particular to an ultrasonic test device and a test method for service stress of a moving mechanical component.

Discussion of the Related Art

In general, when an inspected component of the ultrasonic test is in a static state, the service stress of the component is tested. In practical engineering, for mechanical components such as machine spindles, flywheels, turntables, high-speed railway wheel sets, high-speed railway tracks, moving rods and the like, not only the service stress in the static state, but also the service stress in a moving state needs to be discussed. The obtained service stress in the moving state can help to determine the stability, safety and the like of the inspected component, which has a significant sense on engineering applications.

Ultrasonic testing methods are classified into methods of contact type and methods of non-contact type according to different coupling ways. A probe for the methods of contact type directly contacts a surface of the inspected component, and the probe and the surface of the inspected component are coupled by using a specialized coupling agent. A probe for the methods of non-contact type and the inspected component are not in direct contact, and fluid is used as a coupling agent between the probe and the inspected component. Compared with the methods of contact type, the probe for the methods of non-contact type and the inspected component are not in direct contact, so the methods of non-contact type have more stable ultrasonic emission and contact, are less susceptible to the roughness of the surface in the testing process and easy to adjust an angle of the probe, cause the probe to not touch the surface directly and to not be easy to be damaged, and are convenient for automatic testing.

By combining the above advantages, considering that the moving component is easy to damage the probe by adopting the methods of contact type, surface coupling effect cannot be ensured, and it is difficult to perform ultrasonic detection based on the methods of contact type, a non-contact fluid coupling ultrasonic longitudinal wave testing method for service stress of a moving mechanical component that adopts the methods of non-contact type is proposed.

Patent document CN105158342, entitled an ultrasonic water-immersion nondestructive evaluating method for residual stress, provides an ultrasonic water-immersion nondestructive method for evaluating residual stress. The ultrasonic longitudinal wave is adopted to detect a static inspected component, and water is used as a coupling agent, so that the probe can move quickly and flexibly. Patent document CN107328860, entitled a non-destructive test method for residual stress on a sample surface, provides a liquid-immersion non-contact testing method for testing residual stress by exciting a surface wave with a focusing transducer.

The above two methods each do not consider the test of the inspected component in a moving state, and there is therefore a need for a method for testing the service stress of a component in a relative motion.

SUMMARY

In view of this, the present disclosure provides an ultrasonic test device and test method for service stress of a moving mechanical component, which are commonly used in a method for testing a high-speed rotating axle or machine tool spindle, a flywheel, a turntable, a high-speed railway wheel set, a high-speed railway track, a moving rod component, and likes, and solve the problem of testing the service stress of a moving component.

A first aspect of the present disclosure is to provide an ultrasonic test device for service stress of a moving mechanical component. The test device comprises an ultrasonic probe, a coupling fluid, a pressure-maintaining cover and universal wheels;

the pressure-maintaining cover is vertically arranged above an inspected position of an inspected component, an interior of the pressure-maintaining cover is filled with the coupling fluid, a bottom of the pressure-maintaining cover is provided with a structure permeable to the coupling fluid to form a coupling fluid film between the inspected position and the bottom of the pressure-maintaining cover, at least three universal wheels are arranged on an outer wall of the pressure-maintaining cover, and a top of the pressure-maintaining cover is equipped with the ultrasonic probe;

a detection portion at a lower part of the ultrasonic probe is configured to extend into the coupling fluid of the pressure-maintaining cover and is designed to be vertical to the bottom of the pressure-maintaining cover without contact.

In this way, the bottom structure of the pressure-maintaining cover can allow the coupling fluid to penetrate between the pressure-maintaining cover and the inspected component to form a layer of coupling fluid film. The coupling fluid uniformly flows out from the edge of the coupling fluid film, and at the moment, the pressure in the coupling fluid reaches a stable state. The coupling fluid film covers the inspected position of the inspected component. When the inspected component moves, the coupling fluid film protects the inspected component from contact collision and friction with the pressure-maintaining cover, so that the nondestructive detection of the moving component is realized.

The ultrasonic probe emits ultrasonic waves to the inspected component, and the ultrasonic waves propagate to the inspected position of the inspected component through the coupling fluid, enter the inspected component, and are critically refracted out from the inside of the inspected component to form the ultrasonic echo waves. The ultrasonic echo waves are detected by the ultrasonic probe. The internal stress of the inspected component affects the waveform parameters of the ultrasonic echo waves.

In one embodiment, the top of the pressure-maintaining cover is provided with a coupling fluid inlet. The coupling fluid inlet is used for injecting the coupling fluid into the pressure-maintaining cover in a pressurized manner, so that the flow rate and the pressure of the coupling fluid at the coupling fluid inlet are both greater than the flow rate and the pressure of the coupling fluid flowing out of the coupling fluid film, and the density of the coupling fluid in the pressure-maintaining cover is thus increased.

The attenuation coefficient of the ultrasonic waves in the coupling fluid medium is related to the density of the coupling fluid, that is, the attenuation coefficient becomes smaller as the medium density increases. As the density of the coupling fluid in the pressure-retaining cover is increased through the coupling fluid inlet, the attenuation of the coupling fluid is reduced, the signal-to-noise ratio of ultrasonic signal transmission is improved, clearer received and transmitted ultrasonic signals are obtained, and the detection sensitivity is improved.

In one embodiment, the coupling fluid inlet is provided with a coupling fluid pressure detection device for detecting injection pressure of the coupling fluid. The coupling fluid density in the pressure-maintaining cover can be controlled by controlling the injection pressure of the coupling fluid.

In this way, in some comparative tests such as the test of zero-stress calibration, the density of the coupling fluid in the pressure-maintaining cover can be kept unchanged by controlling the injection pressure of the coupling fluid, and the test accuracy is improved.

In one embodiment, the universal wheels have the same distance from the surface of the inspected component. When the inspected component moves in the horizontal direction and the circumferential direction, the universal wheels can rotate by 360 degrees horizontally, so that the coupling fluid film formed between the pressure-maintaining cover and the inspected component is ensured to keep a constant thickness.

In this way, when the inspected component moves, the universal wheels maintain the thickness of the coupling fluid film, so that the distance between the ultrasonic probe and the inspected component is kept constant, the loss of ultrasonic wave propagation is constant, and a stable test of the moving inspected component is realized.

In one embodiment, a curvature of the bottom of the pressure-maintaining cover matches the curvature of the inspected position of the inspected component.

In this way, the curvature of the bottom of the pressure-maintaining cover is configured to match the curvature of the inspected position of the inspected component, so that the bottom of the pressure-maintaining cover is ensured to be in uniform and reliable contact with the inspected position of the inspected component through the coupling fluid film, and the accuracy of the test is improved.

In one embodiment, the device further comprises a temperature sensor for sensing the temperature of the coupling fluid.

In this way, the temperature of the coupling fluid can affect the propagation speed of the ultrasonic waves, the time delay waveform parameters of the ultrasonic echo waves, and the accuracy of the test for service stress of the inspected component. Therefore, the maintenance of the stable temperature of the coupling fluid is one of the necessary conditions of the accurate test environment.

In some embodiments, the coupling fluid is gas or liquid.

In this way, the coupling fluid is used for coupling and isolating the inspected component and the ultrasonic probe, so as to achieve a non-contact detection of the inspected component. An appropriate fluid can be selected from a gas or a liquid according to different testing requirements.

The service stress of the inspected component can be calculated based on the waveform parameters of the ultrasonic echo waves, and the calculation process is finished by an external control equipment, which does not belong to the device according to the present disclosure and is omitted herein.

By coupling the ultrasonic probe with the inspected component through the coupling fluid, and by injecting the coupling fluid into the pressure-maintaining cover through the coupling fluid inlet in a pressurized manner to increase the density of the coupling fluid in the pressure-maintaining cover, the device provided by the present disclosure can improve the testing sensitivity. By keeping the thickness of the coupling fluid film unchanged through the universal wheels to keep the distance between the inspected component and the ultrasonic probe unchanged, the device provided by the present disclosure can realize a stable, accurate and nondestructive detection for the service stress of the moving component.

A second aspect of the present disclosure is to provide an ultrasonic test method for service stress of a moving mechanical component comprising:

placing the ultrasonic test device for service stress of a dynamic mechanical component above the inspected position of the inspected component, and injecting a coupling fluid into the ultrasonic test device in a pressurized manner;

moving or rotating the inspected component relative to the ultrasonic test device according to a testing requirement; and controlling the ultrasonic probe to emit ultrasonic waves and collect ultrasonic echo waves.

In one embodiment, the ultrasonic test method further comprises a step of zero-stress calibration prior to the ultrasonic test, wherein the step of zero-stress calibration comprises:

manufacturing a reference zero-stress test block that has the same material, surface roughness and curvature as the inspected position of the inspected component, and removing an internal stress of the reference zero-stress test block;

placing the ultrasonic test device above the reference zero-stress test block, injecting the coupling fluid into the ultrasonic test device in a pressurized manner, and recording the pressure and temperature of the coupling fluid in the ultrasonic test device; and controlling the ultrasonic probe to emit ultrasonic waves at least once and collect ultrasonic echo waves, so as to finish the zero-stress calibration;

wherein when the ultrasonic test is carried out on the inspected component, the same pressure and the temperature of the coupling fluid in the ultrasonic test device are the same as those in the step of zero-stress calibration.

In this way, the zero-stress calibration simplifies the parameters of the ultrasonic echo waves be only related to the service stress of the inspected component, and simplifies the correlations of the parameters of the ultrasonic echo waves with the material and height of the coupling fluid, with the thickness of the coupling fluid film, and with the material of the inspected component, constant coefficients. Therefore, the service stress of the component can be calculated based on the parameters of the ultrasonic echo waves.

The calculation of zero-stress calibration is completed by the external control equipment, which does not belong to the contents of the present disclosure and is omitted herein.

EXPLANATION FOR REFERENCE SIGNS

10: ultrasonic probe, 20: pressure-maintaining cover, 21: universal wheels, 22: coupling fluid inlet, 23: coupling fluid, 30: coupling fluid film, 40: inspected component, 40A: reference zero-stress test block, 41: horizontal direction, and 42: circumferential direction

DETAILED DESCRIPTION OF THE EMBODIMENTS

The present disclosure provides a test device and a test method for service stress of a moving mechanical component, which realize non-contact, nondestructive, accurate and stable ultrasonic testing for the service stress of the moving component.

For sake of clarity, some terms are explained as follows.

1. Stress: interactional internal forces are generated among parts of an object when the object is deformed due to external factors (force, humidity, change of temperature field, and the likes), and the internal forces per unit area are referred to as the stress.

2. Ultrasound: it is a sound wave with a frequency higher than 20 khz and a wave length shorter than that of general acoustic waves, has good directivity and strong refractive performance, is easy to obtain more concentrated acoustic energy, and is capable to penetrate an opaque substance, such characteristic of which has been widely used in ultrasonic flaw detection, thickness measurement, distance measurement, remote control, and ultrasonic imaging techniques.

3. Zero-stress calibration: the service stress in the object is related to the waveform parameters of ultrasonic echo waves refracted from the interior of the object, the material of the object, and the coupling fluid between the ultrasonic probe and the object. A test block is subjected to a predetermined stress, the correlation of the waveform parameters of the ultrasonic echo waves with the material of the object and correlation of the waveform parameters with the coupling fluid are corrected into constant coefficients according to the test result, and the waveform parameters of the ultrasonic echo waves are simplified into a single relation with service stress. Such method is called the zero-stress calibration.

The device and method according to embodiments of the present disclosure will be described in detail with reference to the accompanying drawings.

Figure 1A:
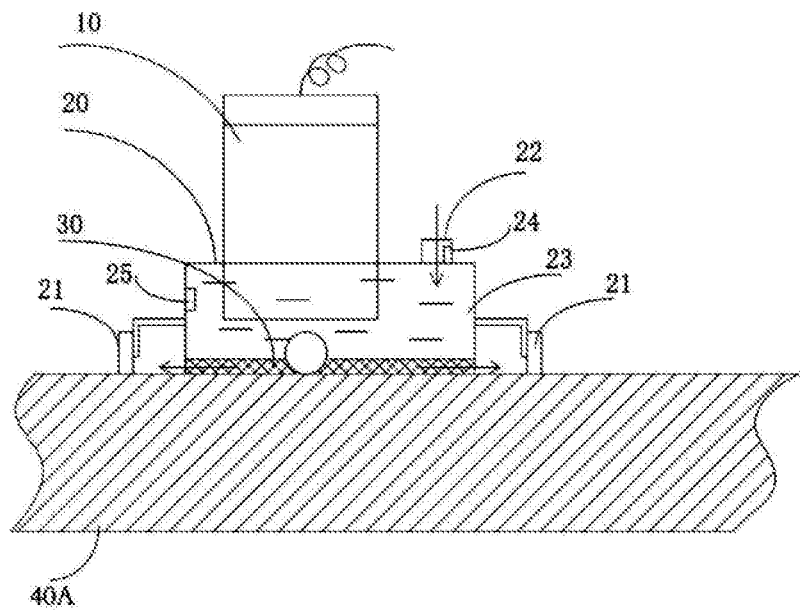
FIGS. 1A and 1B are structural schematic diagrams of a test device according to an embodiment of the present disclosure.
Figure 1B:
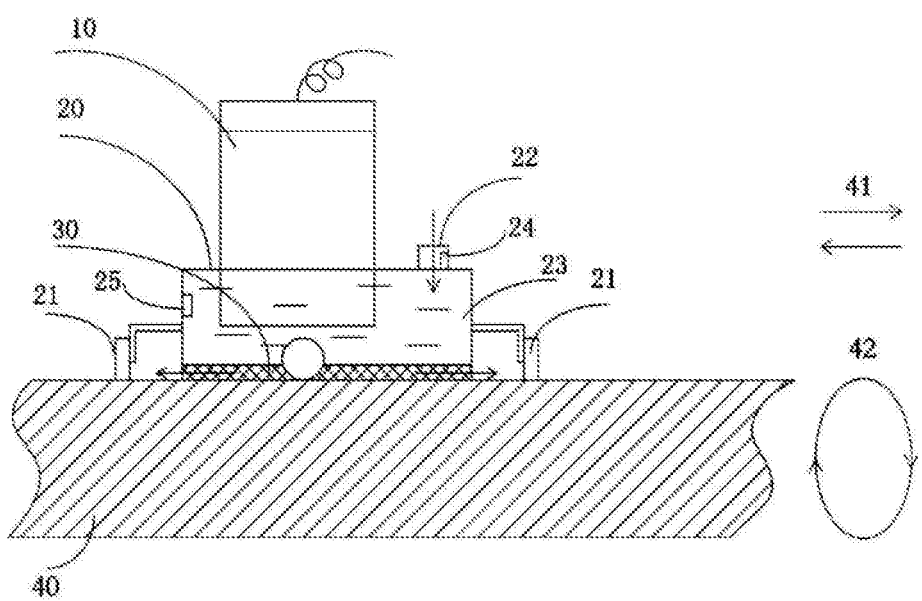
Figure 3:
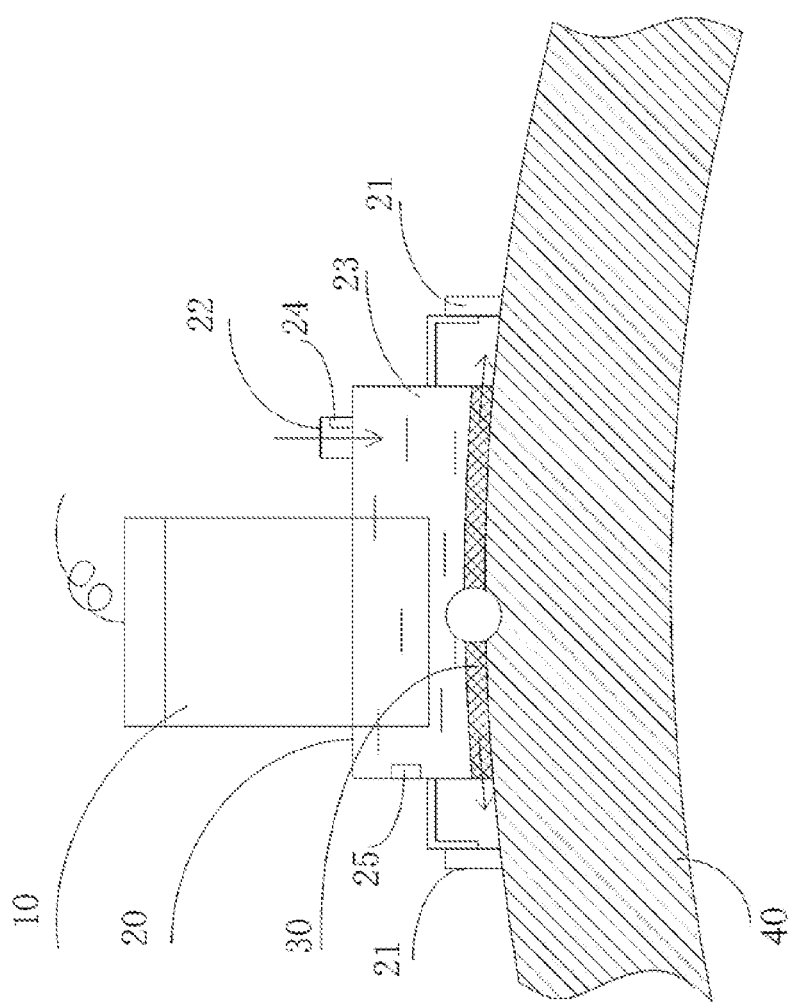
FIG. 3 is a structural schematic diagram of the test device illustrating the curvature of the bottom of the pressure-maintaining cover matching the curvature of the inspected position of the inspected component, where the inspected component is shown with a curved inspected surface viewed from the direction perpendicular to the circumferential direction.

As shown in FIG. 1A, FIG. 1B and FIG. 3, an embodiment of the present disclosure provides a test device for service stress of a mechanical component in a dynamic state, which includes an ultrasonic probe 10, a coupling fluid 23, a pressure-maintaining cover 20 and universal wheels 21.

The pressure-maintaining cover 20 is vertically arranged above the inspected position of an inspected component 40. The coupling fluid 23 is filled in the pressure-maintaining cover 20. The coupling fluid 23 may be liquid or gas. In the present embodiment, liquid is used. A permeable structure at the bottom of the pressure-maintaining cover 20 is provided for forming a coupling fluid film 30 between the bottom of the pressure-maintaining cover 20 and the inspected position. At least three universal wheels 21 are arranged on the outer wall of the pressure-maintaining cover 20. In the present embodiment, four universal wheels 21 are used. The ultrasonic probe 10 is arranged at the top of the pressure-maintaining cover 20.

The detection portion at the lower part of the ultrasonic probe 10 is extended into the coupling fluid 23 of the pressure-maintaining cover 20 and is arranged vertically and in a non-contact way with the bottom of the pressure-maintaining cover 20. The top of the ultrasonic probe 10 is connected with an external control device through a connecting wire.

It can be seen from the above that due to the permeable structure at the bottom of the pressure-maintaining cover 20, the coupling fluid 23 is allowed to permeate between the pressure-maintaining cover 20 and the inspected component 40 to form a layer of coupling fluid film 30. The coupling fluid film 30 covers the inspected position of the inspected component 40. When the inspected component 40 moves, the coupling fluid film 30 protects the inspected component 40 from contact collision and friction with the pressure-maintaining cover 20, so that the nondestructive detection of the moving component is realized.

Wherein, the curvature of the bottom of the pressure-maintaining cover 20 may match the curvature of the inspected position of the inspected component 40, so that even and reliable contact between the bottom of the pressure-maintaining cover 20 and the inspected position of the inspected component 40 through the coupling fluid film 30 is ensured no matter the inspected position of the inspected component 40 moves horizontally along the horizontal direction 41 or rotates in the circumferential direction 42 around the axial direction in the present embodiment, which improves the accuracy of the test.

Wherein, the pressure-maintaining cover 20 may be provided with a coupling fluid inlet 22 for injecting the coupling fluid 23 in a pressurizing condition, so that the inflow flow rate of the coupling fluid 23 at the coupling fluid inlet 22 is larger than the outflow flow rate of the coupling fluid film 30, and the density of the coupling fluid 23 in the pressure-maintaining cover 20 is increased. In this way, the attenuation of the coupling fluid 23 is reduced, the signal-to-noise ratio of ultrasonic signal transmission is improved, clearer received and transmitted ultrasonic signals are obtained, and the detection sensitivity is improved.

Wherein, the coupling fluid inlet 22 of pressure-maintaining cover 20 may be provided with a coupling fluid pressure detection device 24 that detects injection pressure of the coupling fluid 23. By controlling the injection pressure of the coupling fluid 23, the density of the coupling fluid 23 in the pressure-maintaining cover 20 can be maintained during the test, thereby improving the accuracy of the test.

Wherein, the four universal wheels 21 in the present embodiment may have the same distance from the surface of the inspected component. When the inspected component 40 moves in the horizontal direction 41 and in the circumferential direction 42, the universal wheels 21 can rotate horizontally by 360 degrees, so that the coupling fluid film 30 formed between the pressure-maintaining cover 20 and the inspected component 40 is allowed to keep the same thickness. When the inspected component 40 moves, the universal wheels 21 maintain the thickness of the coupling fluid film 30 to be constant, so that the distance between the ultrasonic probe 10 and the inspected component is kept constant, and the loss of ultrasonic wave propagation is thus constant, thereby realizing a stable test of the moving component 40.

It can be seen from the above that under the control of the external control device, the ultrasonic probe 10 emits the inspected component 40 ultrasonic waves, which propagate to the inspected position of the inspected component 40 through the coupling fluid 23, enter the inspected component 40, and are critically refracted out from the interior of the inspected component 40 to form ultrasonic echo waves that are received and sent to the external control equipment by the ultrasonic probe 10. The internal stress of the inspected component 40 affects the waveform parameters of the ultrasonic echo waves.

Since the present embodiment uses liquid as the coupling fluid 23, the ultrasonic probe 10 has good long-term waterproof performance, and the connecting wire of the ultrasonic probe 10 also has good waterproof treatment simultaneously. By this way, the normal and stable work of the probe 10 in liquid is allowed for a long time.

Wherein, the ultrasonic probe 10 of the present embodiment may be further equipped with a temperature sensor 25. The temperature of the coupling fluid 23 may affect the propagation speed of the ultrasonic waves, the time delay waveform parameter of the ultrasonic echo waves, and the accuracy of test of the service stress of the inspected component 40. Therefore, it is desired to maintain the stable temperature of the coupling fluid 23 to achieve an accurate test environment.

The service stress of the inspected component can be calculated based on the waveform parameters of the ultrasonic echo waves. The whole calculation process is completed by the external control equipment, which does not belong to the device of the present embodiment. The calculation process is therefore omitted herein.

By coupling the ultrasonic probe 10 with the inspected component 40 through the coupling fluid 23, and by injecting the coupling fluid 23 into the pressure-maintaining cover 20 through the coupling fluid inlet 22 in a pressurized manner to increase the density of the coupling fluid 23 in the pressure-maintaining cover 20, the test device according to the present embodiment can improve the testing sensitivity. On this basis, by keeping the thickness of the coupling fluid film 30 constant through the universal wheels 21 to keep distance between the inspected component 40 and the ultrasonic probe 10 constant, the test device according to the present embodiment can realize a stable, accurate and non-destructive ultrasonic testing of the service stress of the moving component.

Figure 2:
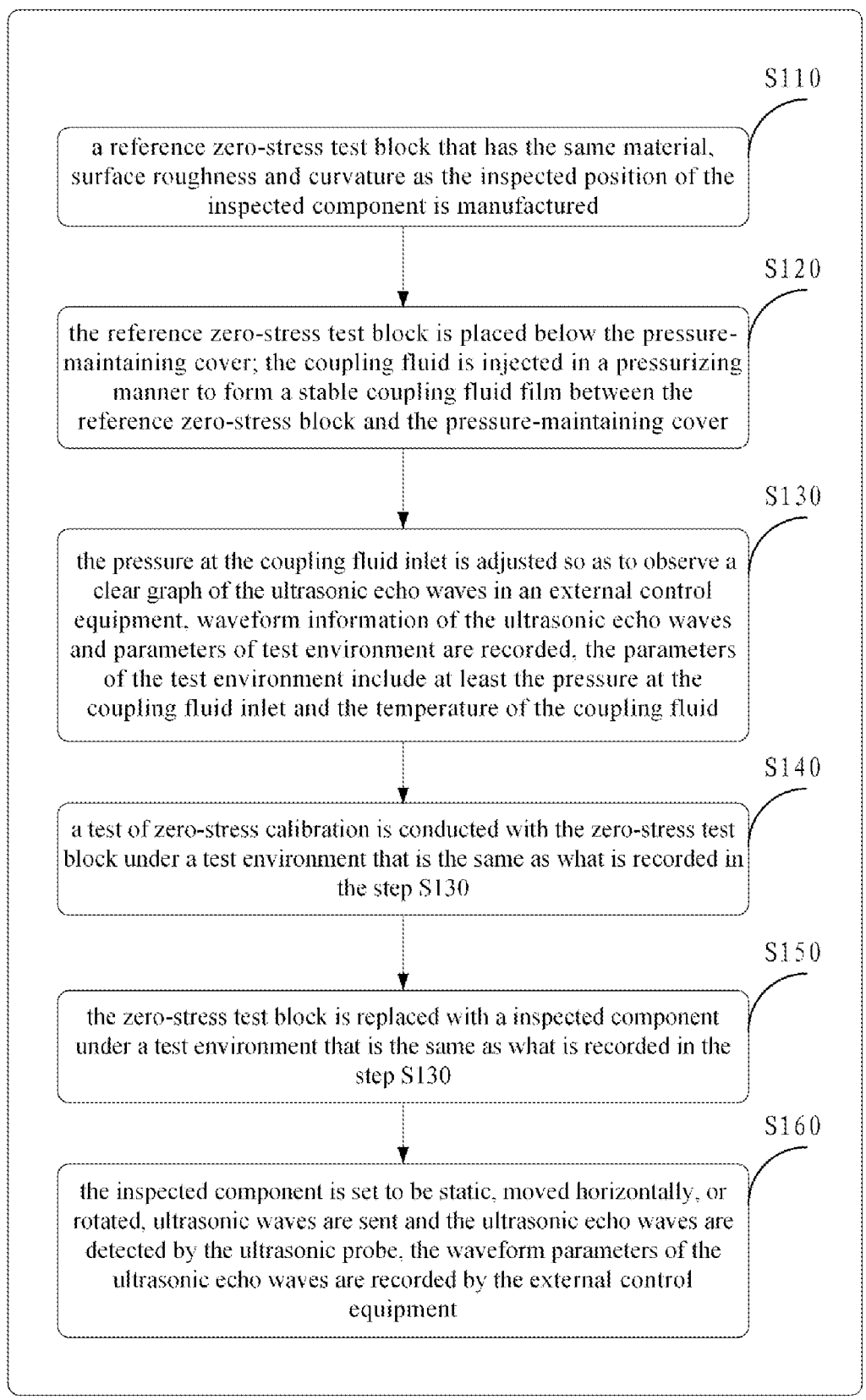
FIG. 2 is a schematic flow chart of a test method according to an embodiment of the present disclosure.

The ultrasonic test method for service stress of a moving mechanical component provided in this embodiment is described below in detail with reference to FIG. 2 and the device shown in FIGS. 1A and 1B. The test method includes steps S110 to S160.

In the step S110, a reference zero-stress test block 40A is manufactured based on the inspected component 40. The reference zero-stress test block 40A has the same material, surface roughness and curvature as the inspected position of the inspected component 40. The internal stress of the reference zero-stress test block 40A is removed by means of annealing.

In the step S120, the reference zero-stress test block 40A is placed below the pressure-maintaining cover 20, the inspected position of the reference zero-stress test block 40A is covered by the pressure-maintaining cover 20, and the coupling fluid 23 is injected in a pressurizing manner through the coupling fluid inlet 22 of the pressure-maintaining cover 20.

In the step S120, the reference zero-stress test block is placed below the pressure-maintaining cover 20, the inspected position of the reference zero-stress test block is covered by the pressure-maintaining cover 20, and the coupling fluid 23 is injected in a pressurizing manner through the coupling fluid inlet 22 of the pressure-maintaining cover 20.

In the step S140, under a test environment where the environmental parameters are the same as the environmental parameters recorded in the step S130, the zero-stress test block is subjected to a stress to complete a zero-stress calibration. The zero-stress calibration requires different stresses to be applied to the reference zero-stress test block 40A to carry out different rounds of tests. Each round of tests includes multiple repeated tests, and the waveform parameters of the ultrasonic echo waves are recorded by the external control equipment during each test.

In the step S150, the reference zero-stress test block 40A is replaced with the moving inspected component 40 so as to carry out a test, of which the environment parameters are the same as the environment parameters recorded in the step S130.

In the step S140, under a test environment where the environmental parameters are the same as the environmental parameters recorded in the step S130, the zero-stress test block is subjected to a stress to complete a zero-stress calibration. The zero-stress calibration requires different stresses to be applied to the reference zero-stress test block to carry out different rounds of tests. Each round of tests includes multiple repeated tests, and the waveform parameters of the ultrasonic echo waves are recorded by the external control equipment during each test.

In the step S150, the reference zero-stress test block is replaced with the moving inspected component 40 so as to carry out a test, of which the environment parameters are the same as the environment parameters recorded in the step S130.

In the step S160, the inspected component 40 is set to be static, move horizontally, or rotate around the horizontal axis according to the testing requirement, the ultrasonic waves are emitted by the ultrasonic probe 10 under the control of the external control equipment, and the waveform parameters of the ultrasonic echo waves are recorded by the external control equipment.

Wherein, the zero-stress calibration simplifies the parameters of the ultrasonic echo waves to be only related to the service stress of the inspected component, and simplifies the correlations of the parameters of the ultrasonic echo waves with material and height of the coupling fluid 23, with the thickness of the coupling fluid film 30, and with the material of the inspected component 40, to be constant coefficients, so that the service stress inside the inspected component 40 can be calculated.

The function of the zero-stress calibration is completed by the external control equipment, which does not belong to the device of the embodiment and is omitted herein.

The above are only the preferred embodiments of the present disclosure, and the scope of protection of the present disclosure should not be limited by this. It should be pointed out that a person skilled in the art may make many other improvements and changes without departing from the spirit and principle of the present disclosure, and the improvements and changes also should be regarded as falling within the scope of protection of the present disclosure.

What is claimed is:

1. A system including a moving mechanical component, a reference zero-stress test block configured for a zero-stress calibration, and a calibrated ultrasonic test device for inspecting service stress of an inspected component of the moving mechanical component at an inspection position, said ultrasonic test device comprising:
    an ultrasonic probe configured to emit ultrasonic waves at least once and collect ultrasonic echo waves;
    a temperature controlled and pressurized coupling fluid;
    a temperature sensor configured to record a calibration temperature of the coupling fluid during the zero-stress calibration with the reference zero-stress block;
    a pressure sensor configured to record a calibration pressure of the coupling fluid during the zero-stress calibration with the reference zero-stress block;
    a pressure-maintaining cover; and
    universal wheels, wherein:
    the reference zero-stress test block is an annealed reference zero-stress test block whereby internal stress has been removed, said reference zero-stress test block including the same material, surface roughness and curvature as the inspection position of the moving mechanic component;
    the pressure maintaining cover is vertically arranged above the inspection position of the inspected component, an interior of the pressure-maintaining cover is filled with the coupling fluid, a bottom of the pressure maintaining cover is provided with a structure permeable to the coupling fluid to form a coupling fluid film between the inspection position and the bottom of the pressure-maintaining cover, at least three of the universal wheels are arranged on an outer wall of the pressure maintaining cover, and a top of the pressure-maintaining cover is equipped with the ultrasonic probe;
    a detection portion at a lower part of the ultrasonic probe is configured to extend into the pressurized coupling fluid of the pressure-maintaining cover and is designed to be vertical to the bottom of the pressure-maintaining cover without contact; and
    the calibrated ultrasonic test device is configured to maintain the pressurized coupling fluid at the calibrated temperature and pressure of the zero-stress calibration.

2. The system of claim 1, wherein the top of the pressure-maintaining cover is provided with a coupling fluid inlet.

3. The system of claim 2, wherein the coupling fluid inlet is provided with the pressure sensor.

4. The system of claim 1, wherein the universal wheels have the same distance from the surface of the inspected component.

5. The system according to claim 1, wherein a curvature of the bottom of the pressure-maintaining cover matches the curvature of the inspection position of the inspected component.

6. The system of claim 1, wherein the coupling fluid is gas or liquid.

7. An ultrasonic test method for service stress of a moving mechanical component comprising:
    placing an ultrasonic test device for service stress of a moving mechanical component above an inspection position of an inspected component, and injecting a coupling fluid into the ultrasonic test device in a pressurized manner, wherein the ultrasonic test device includes an ultrasonic probe, a coupling fluid, a pressure-maintaining cover and universal wheels, wherein the pressure-maintaining cover is vertically arranged above the inspection position of the inspected component, an interior of the pressure-maintaining cover is filled with the coupling fluid, a bottom of the pressure-maintaining cover is provided with a structure permeable to the coupling fluid to form a coupling fluid film between the inspection position and the bottom of the pressure-maintaining cover, at least three of the universal wheels are arranged on an outer wall of the pressure-maintaining cover, a top of the pressure-maintaining cover is equipped with the ultrasonic probe, and a detection portion at a lower part of the ultrasonic probe is configured to extend into the coupling fluid of the pressure-maintaining cover and is designed to be vertical to the bottom of the pressure-maintaining cover without contact;
    moving or rotating the inspected component relative to the ultrasonic test device according to a testing requirement; and
    controlling the ultrasonic probe to emit ultrasonic waves and collect ultrasonic echo waves, wherein
    the method further comprising a step of zero-stress calibration prior to the ultrasonic test, wherein the step of zero-stress calibration comprises:
    manufacturing a reference zero-stress test block that has the same material, surface roughness and curvature as the inspection position of the inspected component, and removing an internal stress of the reference zero-stress test block;
    placing the ultrasonic test device above the reference zero-stress test block, injecting the coupling fluid into the ultrasonic test device in a pressurized manner, and recording a pressure and temperature of the coupling fluid in the ultrasonic test device; and
    controlling the ultrasonic probe to emit ultrasonic waves at least once and collect ultrasonic echo waves, so as to finish the zero-stress calibration,
    wherein when the ultrasonic test is carried out on the inspected component, the pressure and the temperature of the coupling fluid in the ultrasonic test device are the same as those in the step of zero-stress calibration.

* * * * *